United States Patent Office 3,654,281
Patented Apr. 4, 1972

3,654,281
3-SUBSTITUTED-2,3,4,5,6,7,8,12b-OCTAHYDRO-(1H)-[1,4]DIAZEPINO[7,1-a]ISOQUINOLINES
Thomas Alfred Montzka, Manlius, and John Daniel Matiskella, Liverpool, N.Y., assignors to Bristol-Myers Company, New York, N.Y.
No Drawing. Continuation-in-part of abandoned application Ser. No. 862,161, Sept. 24, 1969. This application July 24, 1970, Ser. No. 58,169
Int. Cl. C07d 57/02
U.S. Cl. 260—286 R
18 Claims

ABSTRACT OF THE DISCLOSURE

3 - phenethyl - 2,3,4,5,6,7,8,12b-octahydro-(1H)-[1,4]diazepino[7,1-a]isoquinolines and derivatives thereof are compounds possessing interesting pharmacological activities, i.e., analgetic properties.

CROSS-REFERENCES TO RELATED APPLICATIONS

This application is a continuation-in-part of copending application Ser. No. 862,151, filed Sept. 24, 1969, now abandoned.

BACKGROUND OF THE INVENTION (1) Field of the invention

The compounds of the invention are of particular interest for their analgetic properties.

(2) Description of the prior art

The compounds of the present invention are new and novel. The literature contains references to some related isoquinolines, none of which are the compounds of the present invention.

(a) U.S. Pat. No. 3,045,008 (July 17, 1962) disclosing compounds of the formula

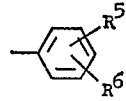

in which R is hydrogen, hydroxyl or —O— (lower)alkyl, R' is hydrogen or (lower)alkenyl, and R" is hydrogen or (lower)alkenyl.

(b) J. G. Lombardino, J. I. Bodin, C. F. Gerber, W. M. McLamore, and G. D. Laubach, J. Med. Chem., 3, 505 (1961).

SUMMARY OF THE INVENTION

The compounds of the present invention are those having the formula

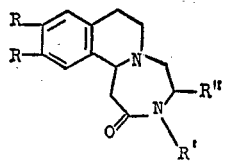

(I)

in which $R^7$ and $R^8$ are alike or different and each is hydrogen, hydroxy, (lower)alkanoyloxy or (lower)alkoxy, $R^2$ is a group having the formula

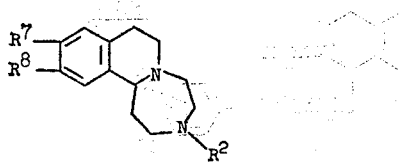

in which m is an integer of 0 to 4 inclusive, n is an integer of 1 to 5 inclusive, $R^3$ is hydrogen, a cycloalkyl group of 3 to 8 carbons, or a phenyl having the formula

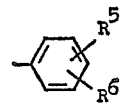

in which $R^5$ and $R^6$ are selected from the group consisting of H, F, Cl, Br, trifluoromethyl, (lower)alkyl, (lower)alkoxy or hydroxy; or a pharmaceutically acceptable salt thereof.

3 - phenethyl - 2,3,4,5,6,7,8,12b - octahydro-(1H)-[1,4]diazepino-[7,1-a]isoquinolines and derivatives thereof are compounds possessing interesting pharmacological activity, i.e., analgetic properties. The compounds are selectively useful in mammals, including man, for the alleviation of pain.

The compounds of the present invention are characterized as having the formula

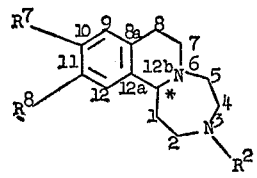

(I)

wherein $R^7$ and $R^8$ are alike or different and each is hydrogen, hydroxy, (lower)alkanoyloxy or (lower)alkoxy; $R^2$ is a group having the formula

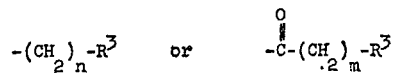

in which n is an integer of 1 to 5 inclusive, m is an integer of 0 to 4 inclusive, $R^3$ is hydrogen, a cycloalkyl group of 3 to 8 carbons inclusive, or a substituted phenyl having the formula

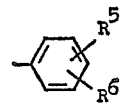

in which $R^5$ and $R^6$ are selected from the group consisting of H, F, Cl, Br, trifluoromethyl, (lower)alkyl, (lower)alkoxy or hydroxy; or a pharmaceutically acceptable nontoxic salt thereof.

For the purpose of this disclosure, the term "(lower)alkyl" is defined as a straight or branched chain aliphatic carbon residue of from 1 to 10 carbon atoms inclusive, i.e., methyl, ethyl, butyl, pentyl, decyl, isopentyl, etc. Also, when the term used incorporates the phrase "(lower)alk-," such as (lower)alkoxy or (lower)alkanoyloxy, the term shall be taken to mean that group containing a carbon residue of from 1 to 10 carbons, i.e., methoxy, propoxy, pentoxy, acetoxy, hexanoyloxy, propanoyloxy, etc.

The nontoxic salts that are pharmaceutically acceptable include those various acid addition salts commonly used in the pharmaceutical art. Examples of such salts include the hydrochlorides, hydrobromides, hydroiodides, (lower)alkylsulfates, (lower)alkyl and aryl sulfonates, phosphates, sulfates, maleates, fumarates, succinates, tartrates, citrates, and the like. Since the compounds of the present invention have two basic nitrogens in their nucleus, the compounds are capable of forming either a mono- or di-salt such as the monohydrochloride or dihydrochloride salt. Which salt is obtained depends upon the technique used in their preparation. In most cases, however, the di-salt is preferred.

The salts obtained through the variation of the acid used in some cases have special advantage due to increased stability, increased solubility, decreased solubility, ease of crystallization, lack of objectionable taste, etc., but these are all subsidiary to the main physiological action of the free base, which is independent of the acid used in the preparation of the salt.

The compounds of the present invention are embodied in any of the known pharmaceutical forms for oral, parenteral or rectal administration. The compounds are prepared in solid compositions for oral administration in unit dosage form as tablets, capsules, pills granules or powders. Solutions, emulsions or suspensions of the compounds are prepared for oral administration also. Sterile suspensions or solutions are prepared for parenteral use. When desirable, the compound is incorporated in suppositories for rectal administration.

The term unit dosage form as used in the specification and claims means a physically distinct entity suitable as a unitary dosage for administration, each unit containing a predetermined quantity of the compound of the present invention. The quantity of the compound contained in the unit dosage form is directly dependent upon the considerations which are well-known in the art of compounding a pharmaceutically active material for therapeutic use. The characteristics of the active compound, the particular therapeutic effect to be achieved, the route of administration and the mechanism of the action of the material in the host are important considerations in determining the quantity of the active compound included in the unit dosage form. Examples of suitable oral unit dosage forms are capsules, pills, tablets, cachets and powder packets for solid compositions, and teaspoonful, dropperful, ampoules and vials for liquid oral dosage forms.

The tablets or pills can be laminated or otherwise compounded to provide for time-release action of the active compound. For example, the tablet or pill can comprise an inner portion constituting one unit dose and an outer portion constituting another unit dose, the outer portion being in the form of an envelope encompassing the inner portion. The two portions can be separated by an enteric layer which serves to delay the release of the action compound contained in the inner portion allowing it to pass intact into the intestine where the enteric layer is destroyed releasing the active compound in the inner portion. Such an enteric layer may consist of any number of known substances such as polymeric derivatives or mixtures thereof, cellulose acetate, cetyl alcohol, shellac, cellulose acetate phthalate and the like.

Examples of oral liquid dosage forms include aqueous solutions, hydroalcoholic solutions, and aqueous or oil suspensions and emulsions wherein the product is dissolved or dispersed in a pharmaceutically acceptable carrier or vehicle. Flavoring agents may be added to increase the palatability of the dosage form. Examples of vehicles are cottonseed oil, seasame oil, peanut oil and the like and acceptable dispersing agents for aqueous suspensions include synthetic and natural gums such as tragacanth, acacia, dextran, methyl cellulose and the like.

Suppositories containing the compounds of the instant invention can be readily prepared in a unit dosage form by mixing the active ingredient with a commonly used suppository base such as theobroma oil, glycerinated gelatin or a polyethylene glycol, and then shaping the mass into a form suited for introduction into the rectum.

The compounds of the present invention are prepared according to one of the following sequences:

Scheme 1

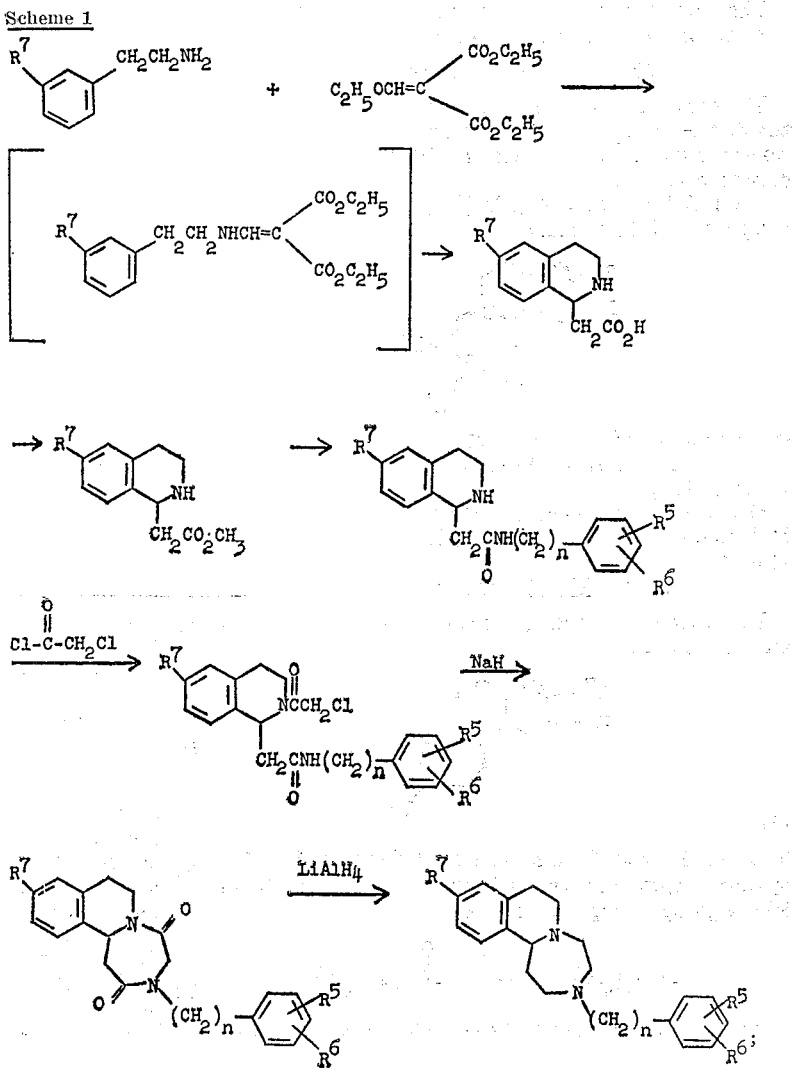

Scheme 2.
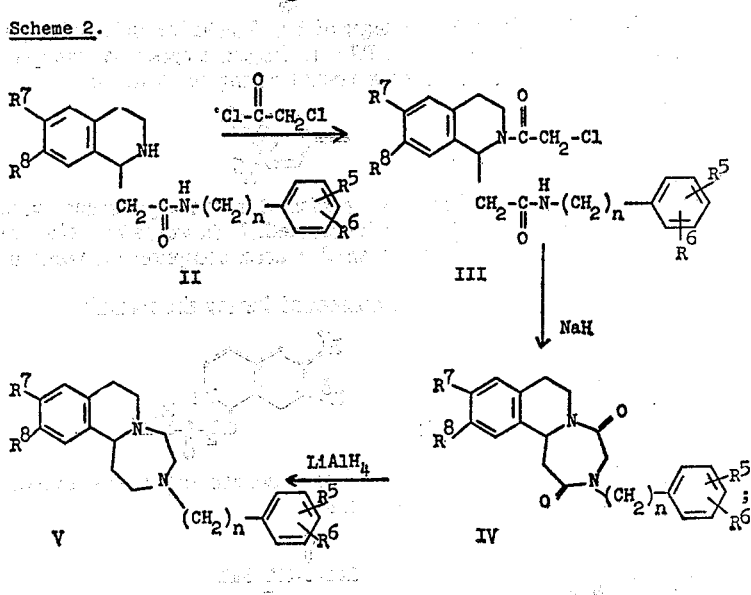
Scheme 3.
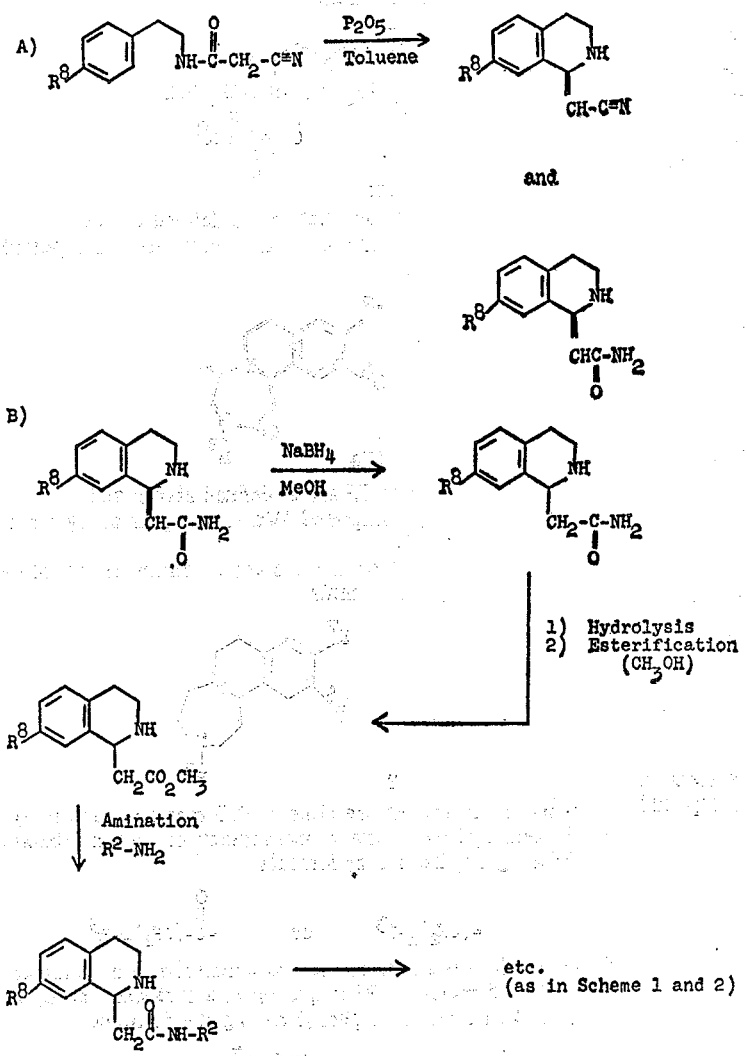
In the above schemes, $n$, $R^5$, $R^6$, $R^7$ and $R^8$ are as previously defined and $R^2$ is a group of the formula
$$-(CH_2)_n-R^3$$
in which $R^3$ is as previously defined.
It should be obvious to those knowledgeable in the art that these compounds can exist in two isomeric forms due to the asymetric carbon atom at position 12b of the nucleus (denoted by asterisk).

The purified epimers are designated R or S in accordance with accepted nomenclature. Thus the R epimer will have the structure as shown below:

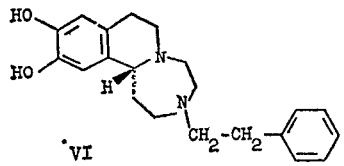

VI

The S epimer will have the structure shown below:

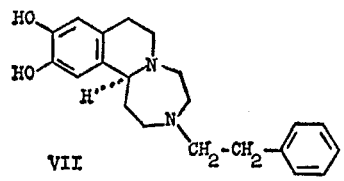

VII

Just which isomer, R or S, is obtained is determined by the starting material used, i.e., Formula II. If it is desired to synthesize the R isomer then one should start with a resolved and purified "R" precursor having the formula

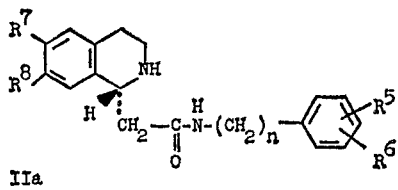

IIa wherein $n$, $R^5$, $R^6$, $R^7$ and $R^8$ are as defined above.

If the S isomer is desired, then one should start with a resolved and purified "S" precursor having the formula

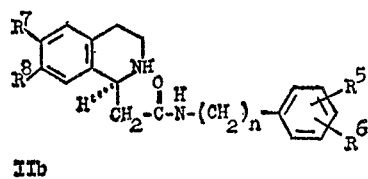

IIb wherein $n$, $R^5$, $R^6$, $R^7$ and $R^8$ are as defined above.

One method of resolution for the preparation of IIa and IIb is taught by T. A. Montzka, T. L. Pindell and J. D. Matiskella, J. Org. Chem., 33, 3993 (1968), U.S. Pat. No. 3,452,086 issued June 24, 1969 (see experimental).

It is particularly noted here that not only do the R and S epimers have different structural presentation, but they likewise have a widely differing pharmacological profile.

For example, the compound having the Formula VI is a protent analgetic agent. In contrast, the compound having Formula VII is a central nervous system depressant and smooth muscle relaxant possessing little, if any, analgetic activity.

The objectives of the present invention have been achieved, by the provision according to the present invention, of the process for the synthesis of compounds having the formula

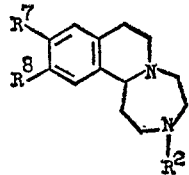

I wherein $R^7$ and $R^8$ are alike or different and each is hydrogen, hydroxy, (lower)alkanoyloxy or (lower)alkoxy; $R^2$ is a group having the formula

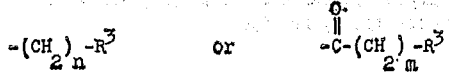

in which $n$ is an integer of 1 to 5 inclusive, $m$ is an integer of 0 to 4 inclusive, $R^3$ is hydrogen, a cycloalkyl group of 3 to 8 carbons, or a phenyl having the formula

in which $R^5$ and $R^6$ are selected from the group consisting of H, F, Cl, Br, trifluoromethyl, (lower)alkyl, (lower)alkoxy or hydroxy; which process comprises the consecutive steps of (a) Acylating a compound having the formula

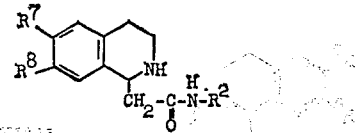

IIc in which $R^7$, $R^8$ and $R^2$ are as defined above; with an haloacetylhalide of the formula

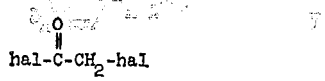

in which hal is halogen selected from the group chloro, bromo or iodo, but preferably chloro, to produce a compound having the formula

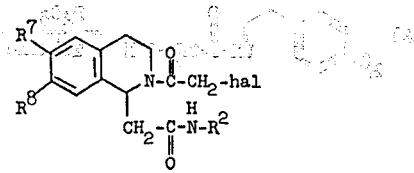

IIIc in which $R^7$, $R^8$, $R^2$ and hal are as defined above;

(b) Cyclizing compound IIIc above to a compound having the formula

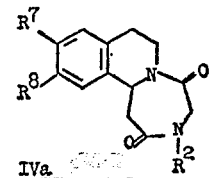

IVa in which $R^7$, $R^8$ and $R^2$ are as defined above; and (c) Reducing compound IVa to compound I by treatment with LiAlH$_4$.

An embodiment of the present invention is the compounds having the formula

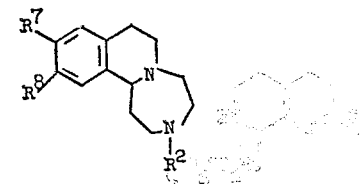

I wherein $R^7$ and $R^8$ are alike or different and each is hydrogen, hydroxy, (lower)alkanoyloxy or (lower)alkoxy, $R^2$ is a group having the formula

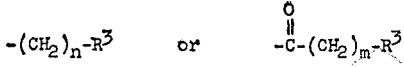

in which $m$ is an integer of 0 to 4 inclusive, $n$ is an integer of 1 to 5 inclusive, $R^3$ is hydrogen, a cycloalkyl group of 3 to 8 carbons, or a phenyl having the formula

in which $R^5$ and $R^6$ are selected from the group consisting of H, F, Cl, Br, trifluoromethyl, (lower)alkyl, (lower)alkoxy or hydroxy; or a pharmaceutically acceptable salt thereof.

A preferred embodiment of the present invention is the compounds having the formula

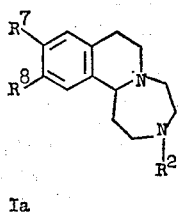

Ia wherein $R^7$ and $R^8$ are hydroxy, (lower)alkanoyloxy or (lower)alkoxy, $R^2$ is a group having the formula

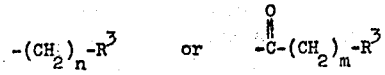

in which $n$ is an integer of 1 to 5 inclusive, $m$ is an integer of 0 to 4 inclusive, $R^3$ is hydrogen, a cycloalkyl group of 3 to 8 carbons inclusive, or a phenyl having the formula

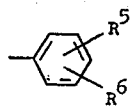

in which $R^5$ and $R^6$ are selected from the group consisting of H, F, Cl, Br, trifluoromethyl, (lower)alkyl, (lower)alkoxy or hydroxy; or a pharmaceutically acceptable nontoxic salt thereof.

A particularly preferred embodiment of the present invention is the compounds of Formula Ia wherein $R^7$ and $R^8$ are hydroxy, (lower)alkanoyloxy or (lower)alkoxy; $R^2$ is a group having the formula

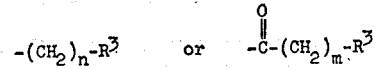

in which $n$ is an integer of 1 to 5 inclusive, $m$ is an integer of 0 to 4 inclusive $R^3$ is hydrogen or a phenyl having the formula

in which $R^5$ is selected from the group consisting of H, F, Cl, Br, trifluoromethyl, (lower)alkyl, (lower)alkoxy or hydroxy; or a pharmaceutically acceptable nontoxic salt thereof.

A still more preferred embodiment of the present invention is the compounds of Formula Ia wherein $R^7$ and $R^8$ are hydroxy, or (lower)alkanoyloxy; $R^2$ is a group having the formula

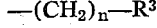

in which $n$ is an integer of 1 to 5 inclusive, $R^3$ is hydrogen or a phenyl having the formula

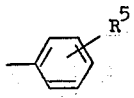

in which $R^5$ is selected from the group consisting of H, F, Cl, Br, trifluoromethyl, (lower)alkyl, (lower)alkoxy or hydroxy; or a pharmaceutically acceptable nontoxic salt thereof.

A still more preferred embodiment of the present invention is the compounds of Formula Ia wherein $R^7$ and $R^8$ are hydroxy or acetoxy; $R^2$ is a group having the formula

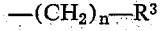

in which $n$ is an integer of 1 to 5 inclusive, $R^3$ is hydrogen

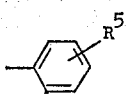

or a phenyl having the formula in which $R^5$ is selected from the group consisting of H, F, Cl, Br, trifluoromethyl, (lower)alkyl, (lower)alkoxy, or hydroxy; or a pharmaceutically acceptable nontoxic salt thereof.

A further preferred embodiment of the present invention are the compounds of Formula Ia wherein $R^7$ and $R^8$ are hydroxy or acetoxy; $R^2$ is a group having the formula

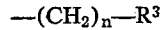

in which $n$ is an integer of 1 to 3 inclusive, $R^3$ is hydrogen or phenyl; or a pharmaceutically acceptable nontoxic salt thereof.

A most preferred embodiment of the present invention are the compounds of Formula Ia wherein $R^7$ and $R^8$ are hydroxy or acetoxy; $R^2$ is a group having the formula

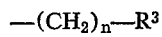

in which $n$ is an integer of 1 to 3 inclusive, and $R^3$ is phenyl; or a pharmaceutically acceptable salt thereof.

Another most preferred embodiment of the present invention are the "R" isomers of the compounds of Formula Ia.

A particularly preferred embodiment of the present invention is the compound having the formula

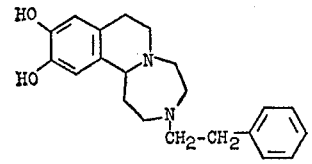

or the hydrochloride or hydrobromide salts thereof.

Another most preferred embodiment of the present invention is the "R" isomer of the compound of Formula X above having the formula

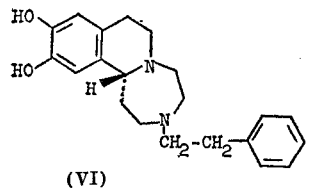

(VI)

or the hydrochloride or hydrobromide salts thereof.

Also preferred embodiments are the compounds having the formula

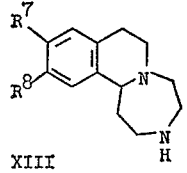

XIII in which $R^7$ and $R^8$ are (lower)alkoxy, hydroxy or (lower)alkanoyloxy because of their value as intermediates in the preparation of the biologically active compounds of the present invention. Further preferred are the resolved, essentially pure "R" and "S" epimers of the compound of Formula XIII.

A preferred embodiment of the present invention is the compounds having the formula

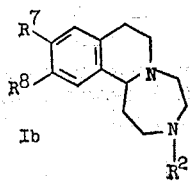

Ib wherein either $R^7$ or $R^8$ is hydrogen and the other is hydrogen, hydroxy, (lower)alkanoyloxy or (lower)alkoxy; $R^2$ is a group having the formula

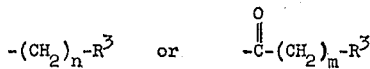

in which $n$ is an integer of 1 to 5 inclusive, $m$ is an integer of 0 to 4 inclusive, $R^3$ is hydrogen, a cycloalkyl group of 3 to 8 carbon inclusive, or a phenyl having the formula

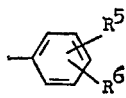

in which $R^5$ and $R^6$ are selected from the group consisting of H, F, Cl, Br, trifluoromethyl, (lower)alkyl, (lower)alkoxy or hydroxy; or a pharmaceutically acceptable nontoxic salt thereof.

A particularly preferred embodiment of the present invention is the compounds of Formula Ib wherein either $R^7$ or $R^8$ is hydrogen and the other is hydrogen, hydroxy, (lower)alkanoyloxy or (lower)alkoxy; $R^2$ is a group having the formula

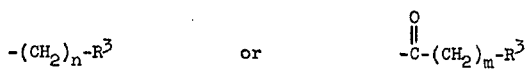

in which $n$ is an integer of 1 to 5 inclusive, $m$ is an integer of 0 to 4 inclusive, $R^3$ is hydrogen or a phenyl having the formula

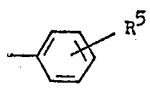

in which $R^5$ is selected from the group consisting of H, F, Cl, Br, trifluoromethyl, (lower)alkyl, (lower)alkoxy or hydroxy; or a pharmaceutically acceptable nontoxic salt thereof.

Another particularly preferred embodiment of the present invention is the compounds of Formula Ib wherein $R^8$ is hydrogen and $R^7$ is hydrogen, hydroxy: (lower)alkanoyloxy or (lower)alkoxy; $R^2$ is a group having the formula

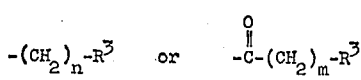

in which $n$ is an integer of 1 to 5 inclusive, $m$ is an integer of 0 to 4 inclusive, $R^3$ is hydrogen or a phenyl having the formula

in which $R^5$ is selected from the group consisting of H, F, Cl, Br, trifluoromethyl, (lower)alkyl, (lower)alkoxy or hydroxy; or a pharmaceutically acceptable nontoxic salt thereof.

A still more preferred embodiment of the present invention is the compounds of Formula Ib wherein $R^8$ is hydrogen and $R^7$ is hydroxy, hydrogen or acetoxy; $R^2$ is a group having the formula $$-(CH_2)_n-R^3$$

in which $n$ is an integer of 1 to 5 inclusive, $R^3$ is hydrogen or a phenyl having the formula

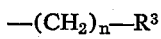

in which $R^5$ is selected from the group consisting of H, F, Cl, Br. trifluoromethyl, (lower)alkyl, (lower)alkoxy or hydroxy; or a pharmaceutically acceptable nontoxic salt thereof.

A further preferred embodiment of the present invention is the compounds of Formula Ib wherein $R^8$ is hydrogen and $R^7$ is hydroxy, hydrogen or acetoxy; $R^2$ is a group having the formula $$-(CH_2)_n-R^3$$

in which $n$ is an integer of 1 to 3 inclusive, $R^3$ is hydrogen or phenyl; or a pharmaceutically acceptable nontoxic salt thereof.

A most preferred embodiment of the present invention is the compounds of Formula I wherein $R^8$ is hydrogen, $R^7$ is hydrogen, hydroxy or acetoxy; $R^2$ is a group having the formula $$-(CH_2)_n-R^3$$

in which $n$ is an integer of 1 to 3 inclusive, and $R^3$ is phenyl; or a pharmaceutically acceptable salt thereof.

Another most preferred embodiment of the present invention are the "R" isomers of the compounds of Formula Ib.

A particularly preferred embodiment of the present invention is the compound having the formula

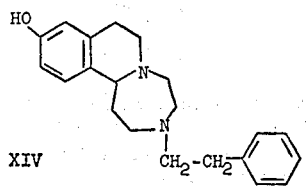

XIV or the hydrochloride or hydrobromide salts thereof.

Another most preferred embodiment of the present invention is the levorotatory isomer of the compound of Formula XIV above; or the hydrochloride or hydrobromide salt thereof.

Another most preferred embodiment of the present invention is the compound of the formula

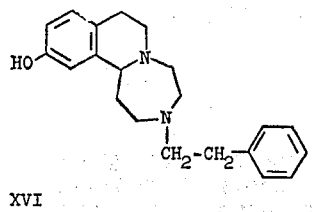

XVI or the hydrochloride or hydrobromide salts thereof.

Also preferred embodiments are the compounds having the formula

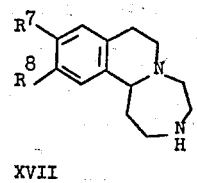

XVII in which either $R^7$ or $R^8$ is hydrogen and the other is hydrogen, (lower)alkoxy, hydroxy or (lower)alkanoyloxy. These compounds are of interest because of their value as intermediates in the preparation of the biologically active compounds of the present invention. Further preferred are the resolved, substantially pure "R" and "S" epimers of the compound of Formula XVII.

The compounds of the present invention were screened for many biological activities and have been shown to possess analgetic activity.

Illustratively, the compound VIa, (R)-10,11-dihydroxy-3-phenethyl-2,3,4,5,6,7,8,12b - octahydro - (1H)-[1,4]diazepino[7,1-a]isoquinoline dihydrobromide, is an analgetic that appears to be essentially equivalent to morphine in terms of potency when administered parenterally to mice or rats.

The following table illustrates the analgesic activity profile of compound VIa in terms of $LD_{50}$ (lethal dose in 50% of the animals, mg./kg.), $ED_{50}$ (effective dose in 50% of the animals, mg./kg.), in the Mouse Hot Plate Test, Rat Tail Flick Test and Rat Pressure.

TABLE I

Analgesic activity profile of Compound VIa (2HBr) and standard reference agents in the mouse and rat

[Acute $LD_{50}$]

| Compound | Mice | | Rats | |
|---|---|---|---|---|
|  | p.o. | s.c. | p.o. | s.c. |
| VIa | >1,536 | 205 | >512 | [2] >160 |
| Morphine, $SO_4$ | [1] 600 | [1] 375 | [1] 905 | [1] 572 |
| Codeine, $SO_4$ | [1] 395 | 250 | [1] 540 | [1] 332 |
|  |  |  | [1] 337 | [1] 235 |
| Darvon | 250 | 120 | 115 | 42.5 |

Mouse hot plate, $ED_{50}$ [3] (95% conf. lt.)

| Compound | p.o | No. of animals | s.c | No. of animals |
|---|---|---|---|---|
| VIa | 116 / 86-155 | 56 | 2.5 / 1.7-3.7 | 90 |
| Morphine, $SO_4$ |  |  | 2.7 / 2.2-3.3 | 102 |
| Codeine, $SO_4$ | 30 / 24-38 | 156 | 11.4 / 8.6-15.1 | 96 |
| Darvon | 51 / 43-61 | 185 | 12.3 / 10.1-14.9 | 125 |

Rat tail flick, $ED_{50}$ [4] (95% conf. lt.)

| Compound | p.o. | No. of animals | s.c. | No. of animals |
|---|---|---|---|---|
| VIa | 97 / 75-125 | 42 | 2.1 / 1.6-2.7 | 60 |
| Morphine, $SO_4$ |  |  | 2.5 / 1.8-3.4 | 90 |
| Codeine, $SO_4$ | 85 / 73-99 | 60 | 7.8 / 5.9-10.2 | 84 |
| Darvon | 37 / 32-42 | 70 | 7.4 / 6.0-9.2 | 55 |

Rat pressure paw

| Compound | Normal paw | | Inflamed paw | |
|---|---|---|---|---|
|  | p.o. MED [5] | No. of animals | p.o. MED [5] | No. of animals |
| VIa | 64 | 48 | 64 | 48 |
| Morphine, $SO_4$ |  |  |  |  |
| Codeine, $SO_4$ | 32 | 42 | 16-32 | 42 |
| Darvon | 16-32 | 48 | 16-32 | 48 |

[1] $LD_{50}$ data obtained from the literature.
[2] Catatonia observed at 150 mg./kg. sc.
[3] Mouse $ED_{50}$=Dose which produced a 50% increase in pain reaction time in 50% of the animals.
[4] Rat $ED_{50}$=Dose which produced a 100% increase in pain reaction time in 50% of the animals.
[5] MED=Lowest dose which produced at least a 10 mm. Hg in pain threshold.

Also illustrative is compound VIIa, (S)-10,11-dihydroxy-3-phenethyl - 2,3,4,5,6,7,8,12b - octahydro - (1H)- [1,4]diazepino[7,1-a]isoquinoline dihydrobromide, which is a smooth muscle relaxant possessing mild central nervous system depressant activity when administered parenterally. The compound possesses little analgetic activity.

Table II illustrates the smooth muscle relaxant qualities as shown below:

TABLE II

[In vitro smooth muscle relaxant activity of Compound VII]

| Compound | Effective Concentration, μg./ml. | |
|---|---|---|
|  | Guinea pig ileum | Rat uterus |
| VIIa (2HBr, $H_2O$) [1] | <0.1 | <1 |
| VIa (2HBr, $H_2O$) | >10 | >5 |
| Papaverine | 5 | >20 |
| Atropine $SO_4$ | 1 | <1 |
| Bristamine | [2] >10 | 2 |
| Isoproterenol HCl | <0.1 | 0.0002 |

[1] Compound VII was ineffective against histamine, acetylcholine and $BaCl_2$ induced contractions in vitro.
[2] Spasmogenic.

Activity of isolated intestinal strips from guinea pigs and rabbits was recorded by a modification of the method of R. Magnus, Arch. Ges. Physiol., 102:123 (1904).

Activity of the isolated rat uterus was recorded as described by Perry, W. L. M.: Pharmacological Experiments on Isolated Preparations, E. & S. Livingstone Ltd., Edinburgh and London, p. 92, 1968.

TABLE III

Uterine relaxant activity of Compound VII in the anesthetized rat

| Compound | Dose, mg./kg.,i.v. | Effect |
|---|---|---|
| VIIa | { 1 | Inhibition of activity for 10 minutes. |
|  | 2 | Inhibition of activity for 20 minutes. |
|  | 3 | Inhibition of activity for >150 minutes. |
| Papaverine | 5 | Inhibition of activity for 10-20 minutes. |

In vivo uterine activity was assayed using Jackson's internal recording technique, adapted to the rat. Jackson, E. D.: Experimental Pharmacology and Materia Medica, The C. V. Mosby Company, St. Louis, Missouri, 2nd ed., p. 89, 1939.

TABLE IV.—BRONCHIAL RELAXANT ACTIVITY OF COMPOUND VII IN THE ANESTHETIZED GUINEA PIG

| Compound: | Minimal effective dose, mg./kg. i.v. |
|---|---|
| VIIa | 3 |
| Isoproterenol | 0.001 |

Bronchial relaxant activity was assayed using a modified method of Konzett and Roessler: Versuchsanordnung zu Untersuchungen an der Bronchialmuskulatur: N. S. Arch. Exp. Pathol. Pharmakol. 195:71–74 (1940). The electrical analog of the overflow air volume was recorded by placing a Statham pressure transducer in the ventilatory circuit of the artificially respired, anesthetized guinea pig.

Compound VI was retested for its analgesic activity in several instances as the dihydrochloride salt (VIb).

In rats, the acute $LD_{50}$ of compound VIb subcutaneously was found to be 250 mg./kg. Its subcutaneous $ED_{50}$ was found to be an average 9.8 mg./kg. in the Mouse Hot Plate Test. In the Rat Tail Flick Test, the subcutaneous $ED_{50}$ was found to be an average 5.2 mg./kg.

In summary, the most recent data obtained on compound VIb would seem to indicate that compound VI is not as potent as analgesic agent as the data above on compound VIa would have originally indicated. Compound VI is a potent analgesic agent but does not now appear to be as potent as morphine.

Another compound of substantial interest as an analgetic agent is 10-hydroxy-3-phenethyl-2,3,4,6,6,7,8,12b-octahydro-(1H)-[1,4]diazepino[7,1-a]isoquinoline (as the free base or salt). This compound, designated compound XIV, was found to be a morphine antagonist as well as a potential analgetic agent.

Upon resolution of the racemic mixture of compound XIV, it was found the majority of the analgetic and morphine antagonist activity resides in the levorotatory isomer (compound XV).

Compound XV was found to be about equipotent to pentazocine in its inhibition of oxymorphone-induced Straub Tail in the mouse. The compound appears slightly more potent than pentazocine in its analgetic effect in the Inflamed Rat Paw Pressure Test. Compound XV was found to be about one-half as active as pentazocine in the phenylquinone-induced writhing test in mice.

The compounds of the present invention are useful in mammals for the alleviation of pain. The compounds are administered, preferably parenterally, in dosages of about 0.1 mg./kg. to about 25 mg./kg. of body weight one to six times a day. A more preferred dosage regimen would be about 0.5 mg./kg. to about 10 mg./kg. of body weight one to four times a day.

Administration of the compounds is conveniently begun at the minimal effective dose (MED) or $ED_{50}$ of the particular compound in the particular species of mammal. However, in general, the particular dosage most suitable for a particular application, as might be expected, will vary with the age, weight and general health of the mammal under treatment and the degree of pain or the spastic muscle condition being treated. After taking into consideration these factors and any other factors to be considered, one skilled in the art of treating diseases of mammals, including man, can readily determine the appropriate dosage.

In the following examples all melting points are expressed in degrees centigrade.

DESCRIPTION OF THE PREFERRED EMBODIMENT

EXAMPLE 1

Preparation of 3-benzyl-10,11-dimethoxy - 2,3,4,5,6,7,8, 12b-octahydro-(1H)-[1,4]-diazepino[7,1 - a]isoquinolinedihydrochloride (A) 2-chloroacetyl-6,7-dimethoxy-1,2,3,4-tetrahydro-1-isoquinoline-N-benzylacetamide

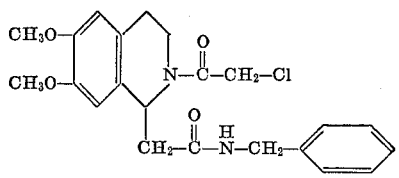

A solution of 6,7-dimethoxy-1,2,3,4-tetrahydro-1-isoquinoline-N-benzylacetamide (0.05 mole), 200 ml. methylene chloride, and 11 ml. triethylamine was treated with a solution of chloroacetyl chloride (0.06 mole) in 50 ml. methylene chloride with cooling. After stirring for one hour at room temperature the mixture was washed with dilute hydrochloric acid, water, dilute sodium carbonate, and saturated sodium chloride. Concentration of the dried methylene chloride extract gave a crystalline solid which was recrystallized from ethanol (80% yield), M.P. 153–154° C.

Analysis.—Calc'd for $C_{22}H_{25}ClN_2O_4$ (percent): C, 63.38; H, 6.04; N, 6.72. Found (percent): C, 63.07; H, 6.30; N, 6.61.

(B) 3-benzyl - 10,11 - dimethoxy - 2,3,4,5,6,7,8,12b - octahydro- (1H)-[1,4]diazepino[7,1a]isoquinoline-2,5-dione

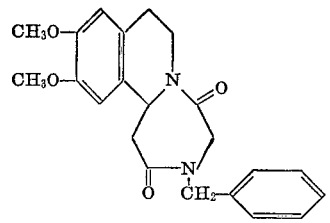

A solution of the compound from part A above (0.01 mole) in 50 ml. dry dimethylformamide was added to a suspension of sodium hydride (0.01 mole) in 75 ml. dry dimethylformamide. This mixture was stirred for twenty hours. After removal of the solvent, the residue was treated with water and extracted with chloroform. Concentration of the extracts left a crystalline residue which was recrystallized from toluene and then ethanol, M.P. 170–171° C.

Analysis.—Calc'd for $C_{22}H_{24}N_2O_4$ (percent): C, 69.45; H, 6.36; N, 7.37. Found (percent): C, 69.35; H, 6.44; N, 7.50.

(C) 3 - benzyl - 10,11 - dimethoxy-2,3,4,5,6,7,8,12b-octahydro- (1H)-[1,4]diazepino[7,1-a]isoquinoline dihydrochloride

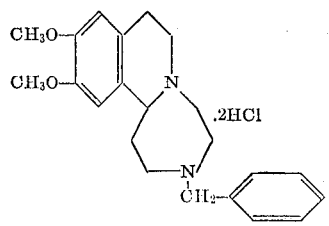

The compound from part B above (0.02 mole) was added in portions to a suspension of lithium aluminum hydride (3 grams) in 100 ml. tetrahydrofuran. This mixture was heated at reflux for twenty hours. The reaction was treated cautiously with 10 ml. saturated sodium sulfate and stirred with warming until completely white.

The solids were removed by filtration and washed with ethyl acetate. Concentration of the filtrates left an oil which was converted to its dihydrochloride salt and recrystallized from ethanol, M.P. 187–202° C.

Analysis.—Calc'd for $C_{22}H_{28}N_2O_2 \cdot 2HCl$ (percent): C, 62.11; H, 7.11; N, 6.59. Found (percent): C, 61.99; H, 7.15; N, 6.91.

EXAMPLE 2

Preparation of 10,11 - dimethoxy - 3 - phenethyl - 2,3,4, 5,6,7,8,12b - octahydro - (1H) - [1,4]diazepino[7.1-a] isoquinoline dihydrochloride

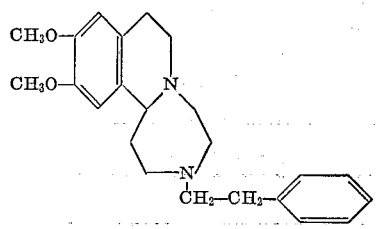

(A) 2-chloroacetyl-6,7-dimethoxy-1,2,3,4-tetrahydro-1-isoquinoline-N-phenethylacetamide Substitution in the procedure of Example 1, part A, for the 6,7 - dimethoxy - 1,2,3,4 - tetrahydro - 1 - isoquinoline - N - benzylacetamide used therein of 6,7-dimethoxy - 1,2,3,4 - tetrahydro - 1 - isoquinoline - N-phenethylacetamide produced the corresponding phenethyl derivative in 80% yield containing 1 mole of ethanol of crystallization, M.P. 72–74° C.

Analysis.—Calc'd for $C_{23}H_{27}ClN_2O_4 \cdot C_2H_5OH$ (percent): C, 62.96; H, 6.95; N, 5.88. Found (percent): C, 62.93; H, 7.21; N, 6.16.

(B) 10,11-dimethoxy-3-phenethyl-2,3,4,5,6,7,8,12b-octahydro- (1H)-[7,1a]isoquinoline-2,5-dione Substitution in the procedure of Example 1, part B, for the 2 - chloroacetyl - 6,7 - dimethoxy - 1,2,3,4 - tetrahydro - 1 - isoquinoline - N - benzylacetamide used therein of 2 - chloroacetyl - 6,7 - dimethoxy - 1,2,3,4-tetrahydro - 1 - isoquinoline - N - phenethylacetamide produced the corresponding phenethyl derivative in 69% yield, M.P. 151–152° C.

Analysis.—Calc'd for $C_{23}H_{26}N_2O_4$ (percent): C, 70.03; H, 6.64; N, 7.10. Found (percent): C, 69.87; H, 6.74; N, 7.26.

(C) 10,11 - dimethoxy - 3 - phenethyl-2,3,4,5,6,7,8,12b-octahydro-(1H)-[1,4]diazepino[7,1a]isoquinoline dihydrochloride Substitution in the procedure of Example 1, part C, for the 3 - benzyl - 10,11 - dimethoxy - 2,3,4,5,6,7,8,12b-octahydro - (1H) - [1,4]diazepino[7,1 - a]isoquinoline-2,5-dione used therein of 10,11 - dimethoxy - 3 - phenethyl 2,3,4,5,6,7,8,12b - octahydro - (1H) - [1,4] diazepino[7,1-a]isoquinoline - 2,5 - dione produced the corresponding phenethyl derivative in 61% yield, M.P. 215–222° C. with decomposition.

Analysis.—Calc'd for $C_{23}H_{30}N_2O_2 \cdot 2HCl$ (percent): C, 62.87; H, 7.35; N, 6.39. Found (percent): C, 63.11; H, 7.58; N, 6.39.

EXAMPLE 3

Resolution of (±) 6,7 - dimethoxy - 1,2,3,4-tetrahydro-1-isoquinoline - N - phenethylacetamide into its (R) and (S) isomers (A) (R) 6,7-dimethoxy-1,2,3,4-tetrahydro-1-isoquinoline-N-phenethylacetamide A warm solution of (±)6,7-dimethoxy-1,2,3,4-tetrahydro - 1 - isoquinoline-N-phenethylacetamide [J. G. Lombardino, J. I. Bodin, C. F. Gerber, W. M. McLamore, and G. D. Laubach, J. Med. Chem., 3, 505 (1961)] (0.29 mole) in 450 ml. 95% ethanol was combined with a warm solution of (+) 2'-nitrotartranilic acid [Thomas A. Montzka et al. J. Org. Chem., 33, 3993 (1968) U.S. Pat. 3,452,086] (0.14 mole) in 450 ml. 95% ethanol. After storage of this mixture at 5° C. for three hours, the crystals were collected and washed thoroughly with cold 95% ethanol (this mother liquor was used for (S) isomer isolation). The yellow crystals were recrystallized from 70% ethanol to give an 82% yield of the salt. This salt was decomposed with sodium carbonate and extracted with methylene chloride to give the (R) isomer which was recrystallized from benzene-"Skellysolve B" (petroleum solvent, essentially n-hexane, B.P. 60–68° C.) to give a 67% yield of the (R) isomer, M.P. 144–145° C., $[\alpha]_D^{25}$ +29.5° (c. 1.21, 95% ethanol).

Analysis.—Calc'd for $C_{21}H_{26}N_2O_3$ (percent): C, 71.16; H, 7.39; N, 7.91. Found (percent): C, 71.43; H, 7.54; N, 7.94.

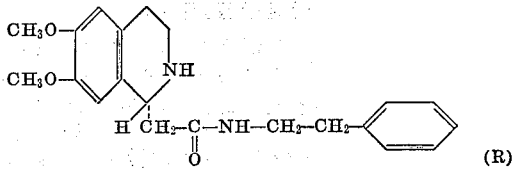

(B) (S) 6,7-dimethoxy-1,2,3,4-tetrahydro-1-isoquinoline-N-phenethylacetamide

The mother liquor from the (+)2'-nitrotartranilic acid salt formation, part A above, was concentrated to dryness. The residue was treated with dilute sodium carbonate and extracted with methylene chloride. Concentration of these extracts left a crystalline residue which was recrystallized from benzene-"Skellysolve B," M.P. 151–155° C., $[\alpha]_D^{25}$ —26° (c., 1.38, 95% ethanol). The optical purity of this material was improved by crystallization of its (—) 2'-nitrotartranilic acid salt. This material has melting point of 143–144° C. and rotation of $[\alpha]_D^{25}$ —29.3° (c. 1.23, 95% ethanol).

Analysis.—calc'd for $C_{21}H_{26}N_2O_3$ (percent): C, 71.16; H, 7.39; N, 7.91. Found (percent): C, 71.44; H, 7.65; N, 7.99.

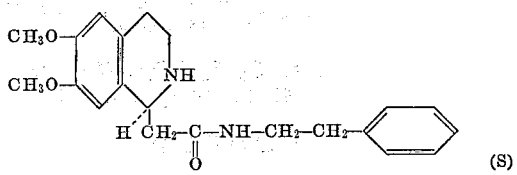

EXAMPLE 4

Preparation of (R) - 10,11 - dimethoxy - 3 - phenethyl-2,3,4,5,6,7,8,12b - octahydro - (1H) - [1,4]diazepino[7,1 - a] isoquinoline dihydrobromide (A) (R) 2-chloroacetyl-6,7-dimethoxy-1,2,3,4,tetrahydro-1-isoquinoline-N-phenethylacetamide Substitution in the procedure of Example 2, part A, of the (R) isomer of 6,7-dimethoxy-1,2,3,4-tetrahydro-1 - isoquinoline - N - phenethylacetamide for the isomeric mixture of same used therein produced the (R) isomer in 89% yield, M.P. 129–130° C. (benzene), $[\alpha]_D^{25}$ —117.1° (c. 1.33, 95% ethanol).

Analysis.—Calc'd for $C_{23}H_{27}ClN_2O_4$ (percent): C, 64.10; H, 6.32; N, 6.50. Found (percent): C, 63.96; H, 6.48; N, 6.31.

(B) (R) 10,11 - dimethoxy-3-phenethyl-2,3,4,5,6,7,8,12b-octahydro-(1H)-[1,4]diazepino[7,1-a]isoquinoline-2,5-dione Substitution in the procedure of Example 2, part B, of the (R) isomer of 2-chloroacetyl-6,7-dimethoxy-1,2,3,4-tetrahydro-1-isoquinoline-N-phenethyl-acetamide for the isomeric mixture of same used therein produced the (R) isomer, in yield of 78%, M.P. 131–133° C., $[\alpha]_D^{25}$ +109.1 (c. 1.39, 95% ethanol).

Analysis.—Calc'd for $C_{23}H_{26}N_2O_4$ (percent): C, 70.03; H, 6.64; N, 7.10. Found (percent): C, 70.10; H, 6.84; N, 7.25.

(R) 10,11-dimethoxy-3-phenethyl-2,3,4,5,6,7,8,12b-octahydro-(1H)-[1,4]diazepino[7,1-a]isoquinoline dihydrobromide Substitution in the procedure of Example 2, part C, of the (R) isomer of 10, 11-dimethoxy-3-phenethyl-2,3,4,5,-6,7,8,12b - octahydro - (1H) - [1,4]diazepino[7,1-a]-isoquinoline-2,5-dione for the isomeric mixture of same used therein produced the (R) isomer in 71% yield, M.P. 224–230° C., $[\alpha]_{436(Hg)}^{25}$ —21.9° (c. 1.26, water).

Analysis.—Calc'd for $C_{23}H_{30}N_2O_2 \cdot 2HBr$ (percent): C, 52.28; H, 6.10; N, 5.30. Found (percent): C, 52.17; H, 6.23; N, 5.18.

EXAMPLE 5

Preparation of (S) - 10,11 - dimethoxy - 3 - phenethyl-2,3,4,5,6,7,8,12b - octahydro - (1H) - [1,4]diazepino [7,1-a]isoquinoline dihydrobromide Starting with the (S) isomer of 6,7-dimethoxy-1,2,3,4-tetrahydro - 1 - isoquinoline - N - phenethylacetamide instead of the isomeric mixture of same and substituting successively in parts A, B and C of Example 2, the following products are obtained.

(A) (S) 2-chloroacetyl-6,7-dimethoxy-1,2,3,4-tetrahydro-1-isoquinoline-N-phenethylacetamide This compound was obtained in 66% yield, M.P. 126–127° C. (ethanol), $[\alpha]_D^{25}$ +117.8° (c. 1.54, 95% ethanol).

Analysis.—Calc'd for $C_{23}H_{27}ClN_2O_4$ (percent): C, 64.10; H, 6.32; N, 6.50. Found (percent): C, 63.80; H, 6.42; N, 6.29.

(B) (S) 10,11-dimethoxy-3-phenethyl-2,3,4,5,6,7,8,12b-octahydro-(1H)-[1,4]diazepino[7,1-a]isoquinoline-2,5-dione This compound was obtained in 74% yield, M.P. 133–134° C., $[\alpha]_D^{25}$ —108.4° (c. 1.16, 95% ethanol).

Analysis.—Calc'd for $C_{23}H_{26}N_2O_4$ (percent): C, 70.03; H, 6.64; N, 7.10. Found (percent): C, 69.93; H, 6.91; N, 6.93.

(C) (S) 10,11-dimethoxy-3-phenethyl-2,3,4,5,6,7,8,12b-octahydro-(1H)-[1,4]diazepino[7,1-a]isoquinoline dihydrobromide This compound was prepared in 69% yield, M.P. 222–228° C., $[\alpha]_{436(Hg)}^{25}$ +22.0° (c. 1.20, water).

Analysis.—Calc'd for $C_{23}H_{30}N_2O_2 \cdot 2HBr$ (percent): C, 52.28; H, 6.10; N, 5.30. Found (percent): C, 52.53; H, 6.26; N, 5.27.

EXAMPLE 6

10,11 - dimethoxy - 2,3,4,5,6,7,8,12b - octahydro - (1H)-[1,4]-diazepino[7,1-a]isoquinoline dihydrochloride A solution of 3-benzyl-10,11-dimethoxy-2,3,4,5,6,7,8,12b - octahydro - (1H) - [1,4]diazepino[7,1-a]isoquinoline dihydrochloride (IV) (0.05 mole) in 100 ml. ethanol containing 2 ml. of 6 N hydrochloric acid was hydrogenated at 42 p.s.i. using 500 mg. of 10% palladium on carbon catalyst. Removal of the catalyst by filtration and concentration gave the title compound as a crystalline solid which was recrystallized twice from ethanol (57% yield), M.P. 190–200° C.

Analysis.—Calc'd for $C_{15}H_{22}N_2O_2 \cdot 2HCl$ (percent): C, 53.73; H, 7.22; N, 8.36. Found (percent): C, 53.63; H, 7.32; N, 8.27.

EXAMPLE 7

10,11 - dimethoxy - 3-methyl-2,3,4,5,6,7,8,12b-octahydro-(1H)[1,4]diazepino[7,1-a]isoquinoline dihydrochloride 10,11 - dimethoxy - 2,3,4,5,6,7,8,12b - octahydro-(1H)-[1,4]diazepino[7,1-a]isoquinoline (0.006 mole) was treated with 2.2 ml. of 88% formic acid and 0.9 ml. of 40% formaldehyde and heated for two hours on a steam bath. The reaction mixture was treated with 3 ml. 6 N hydrochloric acid and concentrated. The dihydrochloride hemihydrate title compound was recrystallized from wet 2-propanol, M.P. 190–197° C.

Analysis.—Calc'd for $C_{16}H_{24}N_2O_2 \cdot 2HCl \cdot \frac{1}{2}H_2O$ (percent): C, 53.63; H, 7.59; N, 7.82; $H_2O$, 2.51. Found (percent): C, 53.94; H, 7.70; N, 7.70; $H_2O$, 2.20.

EXAMPLE 8

3 - cyclopropylmethyl - 10,11 - dimethoxy - 2,3,4,5,6,7,8, 12b - octahydro - (1H)[1,4]diazepino[7,1-a]isoquinoline dihydrobromide A solution of 10,11 - dimethoxy - 2,3,4,5,6,7,8,12b-octahydro - (1H) - [1,4]diazepino[7,1-a]isoquinoline (0.015 mole) in 40 ml. chloroform and 5 ml. triethylamine was treated with a solution of cyclopropylcarbonyl chloride (0.016 mole) in 15 ml. chloroform with ice bath cooling. The mixture was stirred for sixteen hours at room temperature. The mixture was washed with water, dilute sodium carbonate and saturated sodium chloride. Concentration of the chloroform solution yielded the amide (96%). A solution of this amide in 50 ml. tetrahydrofuran was slowly added to a suspension of lithium aluminum hydride (0.056 mole) in 30 ml. tetrahydrofuran. This mixture was heated at reflux for twenty-four hours. The excess hydride and the complexes were cautiously decomposed by the addition of 6.5 ml. saturated sodium sulfate solution. Removal of the solids by filtration and concentration of the filtrate left an oil which was converted to a dihydrobromide and crystallized from 95% ethanol to yield the title compound (50% yield), M.P. 217–223° C.

Analysis.—Calc'd for $C_{19}H_{28}N_2O_2 \cdot 2HBr$ (percent): C, 47.71; H, 6.32; N, 5.86. Found (percent): C, 47.62; H, 6.21; N, 5.79.

EXAMPLE 9

10,11 - dimethoxy - 3 - phenethyl - 2,3,4,5,6,7,8,12b-octahydro - (1H)[1,4]diazepino[7,1-a]isoquinoline dihydrochloride (alternate procedure)

Substitution in the procedure of Example 8 for the cyclopropylcarbonyl chloride used therein of phenylacetylchloride produced the title compound which was identical to that obtained in Example 2, in 40% yield.

EXAMPLE 10

10,11 - dihydroxy - 3 - phenethyl - 2,3,4,5,6,7,8,12b-octahydro - (1H)[1,4]diazepino[7,1 - a]isoquinoline dihydrobromide 10,11 - dimethoxy - 3 - phenethyl - 2,3,4,5,6,7,8,12b-octahydro - (1H) - [1,4]diazepino[7,1-a]isoquinoline (0.004 mole) was treated with 10 ml. 48% hydrobromic acid and heated on a steam bath for 3½ hours. On cooling to room temperature crystals of the title compound separated which were collected and recrystallized from aqueous ethanol, M.P. 178–188° C.

Analysis.—Calc'd for $C_{21}H_{26}N_2O_2 \cdot 2HBr$ (percent): C, 50.41; H, 5.64; N, 5.60. Found (percent): C, 50.75; H, 5.90; N, 5.50.

EXAMPLE 11

(R) 10,11 - dihydroxy - 3 - phenethyl - 2,3,4,5,6,7,8,12b-octahydro - (1H) - [1,4]diazepino[7,1-a]isoquinoline dihydrochloride Substitution in the procedure of Example 10 for the 10,11 - dimethoxy - 3 - phenethyl - 2,3,4,5,6,7,8,12b-octahydro - (1H) - [1,4]diazepino[7,1-a]isoquinoline used therein of the (R) isomer of same produced the title compound in 69% yield, M.P. 194–199° C., $[\alpha]_{365(Hg)}^{25}$ −34.7° (c. 1.35, water).

Analysis.—Calc'd for $C_{21}H_{26}N_2O_2 \cdot 2HBr \cdot H_2O$ (percent): C, 48.82; H, 5.83; N, 5.41; $H_2O$, 3.48. Found (percent: C, 48.85; H, 5.59; N, 5.34; $H_2O$, 3.01.

The dihydrochloride salt was prepared from the dihydrobromide using an ion exchange column (Dowex 1 resin), M.P. 174–179° C., $[\alpha]_{436(Hg)}^{25}$ −36.8° (c. 1.03, methanol).

Analysis.—Calc'd for $C_{21}H_{26}N_2O_2 \cdot 2HCl \cdot \frac{1}{2}H_2O$ (percent): C, 60.00; H, 6.95; N, 6.67. Found (percent): C, 60.28; H, 7.08; N, 6.65.

EXAMPLE 12

(S) 10,11 - dihydroxy - 3 - phenethyl-2,3,4,5,6,7,8,12b-octahydro - (1H) - [1,4]diazepino[7,1-a]isoquinoline dihydrobromide Substitution in the procedure of Example 10 for the 10,11 - dimethoxy - 3 - phenethyl - 2,3,4,5,6,7,8,12b-octahydro-(1H)-[1,4]diazepino[7,1 - a]isoquinoline used therein of the (S) isomer of same produced the title compound of 61% yield, M.P. 177–187° C., $[\alpha]_{365(Hg)}^{25}$ +34.7° (c. 1.25, water).

Analysis.—Calc'd for $C_{21}H_{26}N_2O_2 \cdot 2HBr \cdot H_2O$: (percent): C, 48.82; H, 5.83; N, 5.41; $H_2O$, 3.48. Found (percent): C, 48.86; H, 5.75; N, 5.29; $H_2O$, 3.70.

EXAMPLE 13

10, 11 - dihydroxy - 2,3,4,5,6,7,8,12b - octahydro - (1H)-[1,4]diazepino[7,1-a]isoquinoline dihydrobromide Substitution in the procedure of Example 10 for the 10,11 - dimethoxy - 3 - phenethyl - 2,3,4,5,6,7,8,12b-octahydro - (1H) - [1,4]diazepino[7,1 - a]isoquinoline used therein of 10,11 - dimethoxy - 2,3,4,5,6,7,8,12b-octahydro - (1H)-[1,4]diazepino[7,1-a]isoquinoline produced the title compound in 61% yield as an amorphous solid, M.P. 185–190° C.

Analysis.—Calc'd for $C_{13}H_{18}N_2O_2 \cdot 2HBr$ (percent) C, 39.42; H, 5.08; N, 7.08. Found (percent): C, 38.42; H, 5.45; N, 7.03; $H_2O$, 3.36.

EXAMPLE 14

Anhydrous (R)-10,11 - dihydroxy - 3 - phenethyl-2,3,4,5, 6,7,8,12b - octahydro - (1H) - [1,4]diazepino[7,1-a] isoquinoline dihydrochloride The product can exist in at least two crystal forms, that reported in Example 11 and that prepared here as the anhydrous dihydrochloride salt.

Crystallization from methanol produced the anhydrous salt, M.P. 210–217° C. with decomposition, $[\alpha]_{365(Hg)}^{25}$ −86° (c. 1.06, methanol) or $[\alpha]_{435(Hg)}^{25}$ −37° (c. 1.06, methanol).

Analysis.—Calc'd for $C_{21}H_{26}N_2O_2 \cdot 2HCl$ (percent): C, 61.31; H, 6.86; N, 6.81. Found (percent): C, 61.25; H, 6.96; N, 6.87.

EXAMPLE 15

Preparation of 6,7-dimethoxy-1,2,3,4-tetrahydro-1-isoquinoline-N-substituted-acetamide derivatives The title compounds are prepared using the procedure of Lombardino, Bodin, McLamore and Laubach as described in J. Med. and Pharm. Chem., vol. 3, No. 3 (1961), pages 505–517. The appropriate amine, e.g. benzylamine, is condensed with the known 1-carbethoxymethyl-6,7-dimethoxy-1,2,3,4 - tetrahydroisoquinoline to produce the corresponding-acetamide derivative, e.g., 6,7-dimethoxy - 1,2,3,4 - tetrahydro - 1 - isoquinoline - N-benzylacetamide, M.P. 129–132° C.

EXAMPLE 16

Preparation of 6-methoxy-1,2,3,4-tetrahydro-1-isoquinoline-N-phenethylacetamide hydrate (A) Methyl 6-methoxy-1,2,3,4-tetrahydro-1-isoquinoline-acetate hydrochloride A solution of diethyl ethoxymethylenemalonate (0.067 mole) in 50 ml. absolute ethanol was treated with a solution of 3-methoxyphenethylamine (0.067 mole) in 50 ml. absolute ethanol under a nitrogen atmosphere. After stirring for 18 hours, the solution was concentrated to leave a tan oil. This oil was treated with 100 ml. glacial acetic acid and 100 ml. conc. hydrochloric acid and heated on a steam bath for 3 hours. The solvents were removed at reduced pressure and the residue recrystallized from glacial acetic acid to give pure 6-methoxy-1,2,3,4-tetrahydro-1-isoquinolineacetic acid hydrochloride. This material was esterified with methanol saturated with dry hydrogen chloride to give the title product, M.P. 176.0–178.5° C. (acetonitrile).

Analysis.—Calc'd for $C_{13}H_{12}NO_3 \cdot HCl$ (percent): C, 57.46; H, 6.68; N, 5.15. Found (percent): C, 57.45; H, 6.70; N, 5.28.

(B) 6-methoxy-1,2,3,4-tetrahydro-1-isoquinoline-N-phenethylacetamide hydrate

A mixture of phenethylamine (0.48 mole) and methyl 6-methoxy-1,2,3,4-tetrahydro-1-isoquinolineacetate hydrochloride (0.15 mole) was heated on a steam bath under a nitrogen atmosphere for 18 hours. The reaction mixture was taken up in 210 ml. methanol, diluted with 250 ml. water and cooled to give crystals which were recrystallized from 50% aqueous methanol, M.P. 54–58°.

Analysis.—Calc'd for $C_{20}H_{24}N_2O_2 \cdot H_2O$ (percent): C, 70.15; H, 7.65; N, 8.18; $H_2O$, 5.27. Found (percent): C, 70.02; H, 7.74; N, 8.27; $H_2O$, 5.0.

EXAMPLE 17

Preparation of 10 - hydroxy - 3 - phenethyl - 2,3,4,5,6,7,8,12b - octahydro - (1H) - [1,4]diazepino[7,1-a]isoquinoline dihydrobromide (A) 2-chloroacetyl-6-methoxy-1,2,3,4-tetrahydro-1-isoquinoline-N-phenethylacetamide Substitution in the procedure of Example 1, part A, for the 6,7 - dimethoxy - 1,2,3,4 - tetrahydro - 1 - isoquinoline - N - benzylacetamide used therein of an equimolar quantity of 6-methoxy - 1,2,3,4 - tetrahydro-1-isoquinoline - N - phenethylacetamide produced the title compound in 86% yield, M.P. 112.5–113.5° C. [crystallized from ethyl acetate and Skellysolve B (petroleum solvent, essentially n-hexane)].

Analysis.—Calc'd for $C_{22}H_{25}ClN_2O_3$ (percent): C, 65.91; H, 6.29; N, 6.99. Found (percent): C, 65.91; H, 6.58; N, 6.89.

(B) 10-methoxy-3-phenethyl-2,3,4,5,6,7,8,12b-octahydro-(1H)-[1,4]diazepino[7,1-a]isoquinoline-2,5-dione Substitution in the procedure of Example 1, part B, for the 2-chloroacetyl-6,7-dimethoxy - 1,2,3,4 - tetrahydro-1-isoquinoline-N-benzylacetamide used therein of an equimolar quantity of 2-chloroacetyl-6-methoxy-1,2,3,4-tetrahydro-1-isoquinoline-N-phenethylacetamide produced the title compound in 81% yield.

Two different crystalline forms have been observed. One has a melting point range of 119.5–121.5° (95% ethanol) and the other has a melting point range of 130.5–131.5° C. (ethyl acetate "Skellysolve B" or 95% ethanol).

Analysis.—Calc'd for $C_{22}H_{24}N_2O_3$ (percent): C, 72.50; H, 6.64; N, 7.69. Found (percent): C, 72.55; H, 6.73; N, 7.58.

(C) 10-methoxy-3-phenethyl-2,3,4,5,6,7,8,12b-ictahydro-(1H) [1,4]diazepino[7,1-a]isoquinoline dihydrobromide Substitution in the procedure of Example 1, part C, for the 3 - benzyl - 10-11 - dimethoxy - 2,3,4,5,6,7,8,12b-octahydro - (1H) - [1,4] - diazepino[7,1-a]isoquinoline-2,5-dione and HCl used therein of an equimolar quantity of 10-methoxy-3-phenethyl - 2,3,4,5,6,7,8,12b - octahydro-(1H) - [1,4]diazepino[7,1-a]isoquinoline - 2,5 - dione and HBr produced the title compound in 82% yield, M.P. 215–222° C.

Analysis.—Calc'd for $C_{22}H_{28}N_2O \cdot HBr$ (percent): C, 53.02; H, 6.07; N, 5.69. Found (percent): C, 52.89; H, 6.14; N, 5.88.

(D) 10-hydroxy-3-phenethyl-2,3,4,5,6,7,8,12b-octahydro-(1H) [1,4]diazepino[7,1-a]isoquinoline dihydrobromide 10-methoxy-3-phenethyl - 2,3,4,5,6,7,8,12b - octahydro-(1H)-[1,4]-diazepino[7,1-a]isoquinoline dihydrobromide (0.01 mole) was treated with 25 ml. conc. hydrobromic acid and heated for 4 hours on a steam bath. Evaporation of the hydrobromic acid gave a crystalline residue which was recrystallized from methanol, M.P. 225–235° C.

Analysis.—Calc'd for $C_{21}H_{26}N_2O \cdot 2HBr$ (percent): C, 52.08; H, 5.83; N, 5.79. Found (percent): C, 52.40; H, 6.09; N, 5.99.

EXAMPLE 18

Preparation of 1,2,3,4-tetrahydro-1-isoquinoline-N-phenethylacetamide

A mixture of ethyl 1,2,3,4-tetrahydro-1-isoquinolineacetate[1] (0.2 mole) and 2-phenethylamine (0.3 mole) was heated together on a steam bath for 3 days under a nitrogen atmosphere. The mixture was crystallized from benzene "Skellysolve B" to give the title compound in 70% yield; M.P. 106–107° C.

Analysis.—Calc'd for $C_{19}H_{22}N_2O$ (percent): C, 77.49; H, 7.52; N, 9.52. Found (percent): C, 77.61; H, 7.58; N, 9.53.

EXAMPLE 19

Preparation of 3 - phenethyl- 2,3,4,5,6,7,8,12b-octahydro-(1H)-[1,4]diazepino[7,1 - a]isoquinoline dihydrobromide (A) 2-chloroacetyl-1,2,3,4-tetrahydro-1-isoquinoline-N-phenethylacetamide Substitution in the procedure of Example 1, part A, for the 6,7-dimethoxy-1,2,3,4-tetrahydro - 1 - isoquinoline-N-benzylacetamide used therein of an equimolar quantity of 1,2,3,4-tetrahydro-1-isoquinoline-N-phenethylacetamide produced the title compound in 77% yield, M.P. 107–108° C. (crystallized from ethyl acetate).

Analysis.—Calc'd for $C_{21}H_{23}ClN_2O_2$ (percent): C, 68.00; H, 6.25; N, 7.56. Found (percent): C, 67.66; H, 6.36; N, 7.73.

(B) 3-phenethyl-2,3,4,5,6,7,8,12b-octahydro-(1H)-[1,4]diazepino[7,1-a]isoquinoline Substitution in the procedure of Example 1, part C, for the 2-chloroacetyl-6,7-dimethoxy-1,2,3,4-tetrahydro - 1-isoquinoline-N-benzylacetamide used therein of an equimolar quantity of 2-chloroacetyl-1,2,3,4-tetrahydro-1-isoquinoline-N-phenethylacetamide produced the title compound in 35% yield; M.P. 106–108° C. (crystallized from benzene-Skellysolve B).

Analysis.—Calc'd for $C_{21}H_{22}N_2O_2$ (percent): C, 75.42; H, 6.63; N, 8.38. Found (percent): C, 75.58; H, 6.53; N, 8.55.

(C) 3-phenethyl-2,3,4,5,6,7,8,12b-octahydro-(1H)-[1,4]diazepino[7,1-a]isoquinoline dihydrobromide Substitution in the procedure of Example 1, part C, for the 3-benzoyl-10,11-dimethoxy-2,3,4,5,6,7,8,12b - octahydro - (1H) - [1,4]diazepino[7,1-a]isoquinoline-2,5-dione and HCl used therein of an equimolar quantity of 3-phenethyl - 2,3,4,5,6,7,8,12b - octahydro-(1H)-[1,4]diazepino[7,1-a]isoquinoline-2,5-dione and HBr produced the title compound in 81% yield; M.P. 201–211° C. (crystallized from water-methanol).

Analysis.—Calc'd for $C_{21}H_{26}N_2 \cdot 2HBr$ (percent): C, 53.86; H, 6.03; N, 5.98. Found (percent): C, 53.86; H, 5.99; N, 5.99.

EXAMPLE 20

Preparation of 1,2,3,4-tetrahydro-1-isoquinoline-N-benzylacetamide

A mixture of ethyl 1,2,3,4-tetrahydro-1-isoquinolineacetate (0.19 mole) and benzylamine (0.24 mole) was

[1] W. Sabotka, W. N. Beverung, G. C. Munoz, J. C. Sircar and A. I. Meyers, J. Org. Chem., 30, 3667 (1965).

heated on a steam bath for 18 hours under a nitrogen atmosphere. The resultant crystalline mass was recrystallized from benzene to give the title compound in 81% yield, M.P. 110–111° C.

*Analysis.*—Calc'd for $C_{18}H_{20}N_2O$ (percent): C, 77.11; H, 7.19; N, 9.99. Found (percent): C, 76.96; H, 7.30; N, 10.07.

EXAMPLE 21

Preparation of 3-benzyl-2,3,4,5,6,7,8,12b-octahydro-(1H)-[1,4]-diazepino[7,1-a]isoquinoline dihydrochloride (A) 2-chloroacetyl-1,2,3,4-tetrahydro-1-isoquinoline-N-benzylacetamide Substitution in the procedure of Example 1, part A, for the 6,7-dimethoxy-1,2,3,4-tetrahydro - 1 - isoquinoline-N-benzylacetamide used therein of an equimolar quantity of 1,2,3,4-tetrahydro-1-isoquinoline - N - benzylacetamide produced the title compound in 70% yield; M.P. 121–122° C. (crystallized from ethanol).

*Analysis.*—Calc'd for $C_{20}H_{21}ClN_2O_2$ (percent): C, 67.45; H, 5.92; N, 7.86. Found (percent): C, 67.81; H, 6.30; N, 7.95.

(B) 3-benzyl-2,3,4,5,6,7,8,12b-octahydro-(1H)-[1,4] diazepino[7,1-a]isoquinoline-2,5-dione Substitution in the procedure of Example 1, part B, for the 2-chloroacetyl-6,7-dimethoxy-1,2,3,4-tetrahydro-1-isoquinoline-N-benzylacetamide used therein of an equimolar quantity of 2-chloroacetyl-1,2,3,4-tetrahydro-1-isoquinoline-N-benzylacetamide produced the title compound in 93% yield as an oil. The oil did not crystallize and was used in step C without further purification.

(C) 3-benzyl-2,3,4,5,6,7,8,12b-octahydro-(1H)-[1,4] diazepino[7,1-a]isoquinoline dihydrochloride Substitution in the procedure of Example 1, part C, for the 3-benzyl-10,11-dimethoxy-2,3,4,5,6,7,8,12b-octahydro - (1H) - [1,4] - diazepino[7,1-a]isoquinoline-2,5-dione used therein of an equimolar quantity of 3-benzyl-2,3,4,5,6,7,8,12b-octahydro - (1H) - [1,4]diazepino[7,1-a]isoquinoline-2,5-dione produced the title compound in 62% yield, as a hemithanolate; M.P. 175–185° C.

*Analysis.*—Calc'd for $C_{20}H_{24}N_4 \cdot 2HCl \cdot \frac{1}{2}C_2H_5OH$ (percent): C, 64.93; H, 7.53; N, 7.22. Found (percent): C, 64.52; H, 7.80; N, 7.59.

EXAMPLE 22

Preparation of 2,3,4,5,6,7,8,12b-octahydro-(1H)-[1,4]-diazepino[7,1-a]isoquinoline dihydrochloride A solution of 3 - benzyl - 2,3,4,5,6,7,8,12b - octahydro-(1H)-[1,4]diazepino[7,1-a]isoquinoline dihydrochloride in 50% ethanol and 6 N hydrochloric acid was hydrogenated over 10% palladium on carbon catalyst to give the title compound as a hemimethanolate in 93% yield, M.P. 180–225° C.

*Analysis.*—Calc'd for $C_{13}H_{18}N_2 \cdot 2HCl \cdot \frac{1}{2}CH_3OH$ (percent): C, 55.69; H, 7.62; N, 9.60. Found (percent): C, 55.51; H, 7.62; N, 9.69.

EXAMPLE 23

Preparation of 3-(3,4-dimethoxyphenethyl)-2,3,4,5,6,7,8,12b-octahydro-(1H)-[1,4]diazepino[7,1-a]isoquinoline dihydrobromide Substitution in the procedure of Example 8 for the 10,11-dimethoxy-2,3,4,5,6,7,8,12b-octahydro-(1H) - [1,4] diazepino[7,1 - a]isoquinoline and cyclopropylcarbonyl chloride used therein of equimolar quantities of 2,3,4,5,6,7,8,12b-octahydro-(1H)-[1,4]diazepino[7,1-a]isoquinoline and 3,4-dimethoxyphenylacetyl chloride produced the title product in 45% yield; M.P. 212–232° C.

*Analysis.*—Calc'd for $C_{23}H_{30}N_2O_2 \cdot 2HBr$ (percent): C, 52.28; H, 6.11; N, 5.30. Found (percent): C, 52.13; H, 6.27; N, 5.48.

EXAMPLE 24

Preparation of 10,11-diacetoxy-3-phenethyl-2,3,4,5,6,7,8,12b-octahydro-(1H)-[1,4]diazepino[7,1-a]isoquinoline dihydrochloride A cooled stirred suspension of 10,11-dihydroxy-3-phenethyl - 2,3,4,5,6,7,8,12b - octahydro - 1(H) - [1,4]diazepino[7,1-a]isoquinoline dihydrochloride (0.012 mole) in 50 ml. methylene chloride and 12 ml. triethylamine was treated with a solution of acetyl chloride (0.05 mole) in 25 ml. methylene chloride. After stirring for 18 hours at room temperature, the mixture was washed with water and dilute sodium carbonate, dried over magnesium sulfate and concentrated to leave a dark oil. This oil was converted to a dihydrochloride salt in acetone with dry hydrogen chloride gas and recrystallized from acetonitrile-water; M.P. 205–230° C.

*Analysis.*—Calc'd for $C_{25}H_{30}N_2O_4 \cdot 2HCl$ (percent): C, 60.60; H, 6.51; N, 5.66. Found (percent): C, 60.67; H, 6.70; N, 5.86.

EXAMPLE 25

Resolution of 10-methoxy-3-phenethyl-2,3,4,5,6,7,8,12b-octahydro-(1H)-[1,4]diazepino[7,1-a]isoquinoline (A) A mixture of 10-methoxy-3-phenethyl-2,3,4,5,6,7,8,12b-octahydro-(1H) - [1,4]diazepino[7,1-a]isoquinoline (free base- (0.03 mole) and (+) tartaric acid (0.015 mole) was taken up in warm 95% ethanol and cooled slowly to room temperature. The resulting crystals were collected and recrystallized from aqueous methanol, M.P. 173.5–175.5°. Decomposition of this salt gave the free base as an oil, $[\alpha]_D^{25}$ —68.4° (c. 2.8, chloroform). Conversion of this oil to a dihydrobromide salt and recrystallization from 95% ethanol afforded pure (+) 10-methoxy-3-phenethyl-2,3,4,5,6,7,1,12b-octahydro - (1H)-[1,4]diazepino-[7,1-a]isoquinoline dihydrobromide, M.P. 212–225° C., $[\alpha]_D^{25}$ +17.8° (c. 1.2, methanol).

*Analysis.*—Calc'd for $C_{22}H_{28}N_2O \cdot 2HBr$ (percent): C, 53.02; H, 6.07; N, 5.62. Found (percent): C, 53.01; H, 5.81; N, 5.64.

(B) The mother liquor from the (+) tartaric acid salt formation was concentrated to dryness. This residue was treated with dilute sodium carbonate and extracted with methylene chloride. Drying and concentration of this extract gave an oil which was treated with (—) tartaric acid (0.015 mole), dissolved in 75 ml. hot 95% ethanol and cooled slowly to room temperature. The crystals were collected and carried through the same process as described above to give the free base as an oil, $[\alpha]_D^{25}$ +68.4° (c. 2.5, chloroform), and (—) 10-methoxy-3-phenethyl-2,3,4,5,6,7,8,12b-octahydro (1H) - [1,4]diazepino[7,1-a]isoquinoline dihydrobromide, M.P. 214–225° C., $[\alpha]_D^{25}$ —17.5° (c. 1.1, methanol).

*Analysis.*—Calc'd for $C_{22}H_{28}N_2O \cdot 2HBr$ (percent): C, 53.02; H, 6.07; N, 5.62. Found (percent): C, 53.12; H, 6.08; N, 5.75.

EXAMPLE 26

Preparation of (+) 10-hydroxy-3-phenethyl-2,3,4,5,6,7,8,12b-octahydro-(1H)-[1,4]diazepino[7,1-a]isoquinoline dihydrobromide A mixture of 25 ml. concentrated hydrobromic acid and (+) 10-methoxy-3-phenethyl-2,3,4,5,6,7,8,12b-octahydro (1H)-[1,4]diazepino[7,1 - a]isoquinoline dihydrobromide (0.0084 mole) was heated on a steam bath for three hours. The residue, after removal of the concentrated hydrobromic acid at reduced pressure, was recrystallized from aqueous methanol to give pure title compound, M.P. 236–244° C. (decomposition), $[\alpha]_{326\,Hg}^{25}$ +19.5° (c. 105, water).

*Analysis.*—Calc'd for $C_{21}H_{26}N_2O \cdot 2HBr$ (percent): C, 52.08; H, 5.83; N, 5.79. Found (percent): C, 52.13; H, 5.78; N, 5.89.

EXAMPLE 27

Preparation of (—) 10-hydroxy-3-phenethyl-2,3,4,5,6,7,8, 12b-octahydro-(1H)-[1,4]diazepino[7,1-a]isoquinoline dihydrobromide Substitution in the procedure of Example 25 for the (+) isomer used therein of an equimolar quantity of the (—) 10-methoxy - 3 - phenethyl-2,3,4,5,6,7,8,12b-octahydro-(1H)-[1,4]diazepino[7,1-a]isoquinoline dihydrobromide produced the title compound, M.P. 234–241° C. (decomposition), $[\alpha]_{436}^{25}$ —19.3° (c. 1.03, water).

Analysis.—Calc'd for $C_{21}H_{26}N_2O \cdot 2HBr$ (percent): C, 52.08; H, 5.83; N, 5.79. Found (percent): C, 52.25; H, 5.92; N, 5.82.

EXAMPLE 28

Preparation of 7-methoxy-1-carbomoylmethylene-1,2,3,4-tetrahydroisoquinoline

A warm solution of cyano-N-(p-methoxyphenethyl)-acetamide [2] (0.09 mole) in 800 ml. toluene was treated with 147 g. $P_2O_5$ in several portions over a period of ½ hour with stirring. This mixture was heated at reflux for 4 hours. After cooling the toluene was decanted and the residue treated with ice and water. This was basified with sodium carbonate and extracted with methylene chloride to give a mixture of two products. Separation of this mixture by fractional crystallization gave 7-methoxy-1-cyanomethylene - 1,2,3,4 - tetrahydroisoquinoline, M.P. 81–82° C., and 7-methoxy-1-carbamoylmethylene-1,2,3,4-tetrahydroisoquinoline, M.P. 142–143° C.

Analysis.—Calc'd for $C_{12}H_{14}N_2O_2$ (percent): C, 66.03; H, 6.47; N, 12.84. Found (percent): C, 66.27; H, 6.52; N, 12.63.

EXAMPLE 29

Preparation of 7-methoxy-1,2,3,4-tetrahydro-isoquinoline-1-acetamide hydrochloride A solution of 7-methoxy-1-carbamoylmethylene-1,2,3,4-tetrahydroisoquinoline (0.02 mole) in 50 ml. methanol was treated with $NaBH_4$ (0.02 mole) and stirred for 3 hours. The methanol was removed at reduced pressure. The residue was treated with water and extracted with methylene chloride. Concentration of the extracts gave a crystalline residue which was converted to its hydrochloride in 2-propanol to give 7-methoxy-1,2,3,4-tetrahydro-isoquinoline-1-acetamide hydrochloride, M.P. 215–217° C.

Analysis.—Calc'd for $C_{12}H_{16}N_2O_2 \cdot HCl$ (percent): C, 56.13; H, 6.67; N, 10.91. Found (percent): C, 56.15; H, 6.78; N, 11.03.

EXAMPLE 30

Preparation of ethyl 7-methoxy-1,2,3,4-tetrahydro-isoquinoline-1-acetate hydrochloride Ten grams of 7 - methoxy - 1,2,3,4 - tetrahydroisoquinoline-1-acetamide hydrochloride is dissolved in 50 ml. each of concentrated hydrochloric acid and glacial acetic acid and heated for about 3 to 4 hours. The solvents are removed in vacuo and the solid residues obtained therefrom are dissolved in 75 ml. of ethanol saturated with dry HCl gas. After allowing the solution to stand for several hours at room temperature, the solvents are again removed in vacuo to produce the title product.

EXAMPLE 31

Preparation of 7-methoxy-1,2,3,4-tetrahydro-1-isoquinoline-N-phenethylacetamide hydrochloride A mixture of excess phenethylamine and ethyl 7-methoxy - 1,2,3,4 - tetrahydroisoquinoline 1 - acetate hydrochloride is heated on a steam bath under a nitrogen atmosphere for 18 hours. The solution is diluted with methanol and then diluted with water to produce the title compound as crystals which are recrystallized from water-methanol.

[2] U.S. Patent No. 2,963,478 (Dec. 6, 1960).

EXAMPLE 32

Preparation of 11-hydroxy-3-phenethyl-2,3,4,5,6,7,8,12b-octahydro - (1H) - [1,4]diazepino[7,1-a]isoquinoline dihydrobromide (A) 2-chloroacetyl-7-methoxy-1,2,3,4-tetrahydro-1-isoquinoline-N-phenethylacetamide Substitution in the procedure of Example 1, part A, for the 6,7 - dimethoxy - 1,2,3,4 - tetrahydro - 1 - isoquinoline - N - benzylacetamide used therein of an equimolar quantity of 7 - methoxy - 1,2,3,4 - tetrahydro-1-isoquinoline-N-phenethylacetamide produces the title compound.

(B) 11-methoxy-3-phenethyl-2,3,4,5,6,7,8,12b-octahydro-(1H)-[1,4]diazepino[7,1-a]isoquinoline-2,5-dione Substitution in the procedure of Example 1, part B, for the 2 - chloroacetyl - 6,7 - dimethoxy - 1,2,3,4 - tetrahydro - 1 - isoquinoline - N - benzylacetamide used therein of an equimolar quantity of 2 - chloroacetyl - 7 - methoxy - 1,2,3,4 - tetrahydro - 1 - isoquinoline - N - phenethylacetamide produces the title compounds.

(C) 11-methoxy-3-phenethyl-2,3,4,5,6,7,8,12b-octahydro-(1H) [1,4]diazepino[7,1-a]isoquinoline dihydrobromide Substitution in the procedure of Example 1, part C, for the 3 - benzyl - 10,11 - dimethoxy - 2,3,4,5,6,7,8,12b-octahydro - (1H) - [1,4] - diazepino[7,1-a]isoquinoline-2,5-dione and HCl used therein of an equimolar quantity of 11 - methoxy - 3 - phenethyl - 2,3,4,5,6,7,8,12b - octahydro - (1H) - [1,4]diazepino[7,1-a]isoquinoline - 2,5-dione and HBr produces the title compound.

(D) 11-hydroxy-3-phenethyl-2,3,4,5,6,7,8,12b-octahydro-(1H) [1,4]diazepino[7,1-a]isoquinoline dihydrobromide 11 - methoxy - 3 - phenethyl - 2,3,4,5,6,7,8,12b - octahydro - (1H) - [1,4]diazepino[7,1-a]isoquinoline dihydrobromide (0.01 mole) is treated with 25 ml. conc. hydrobromic acid and heated for 4 hours on a steam bath. Evaporation of the hydrobromic acid gives a crystalline residue which is recrystallized from methanol to yield the title product.

We claim:
1. A compound having the formula

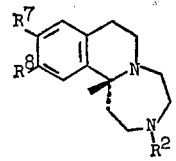

wherein $R^7$ and $R^8$ are alike and are hydrogen, hydroxy, (lower)alkanoyloxy or (lower)alkoxy, $R^2$ is a group having the formula

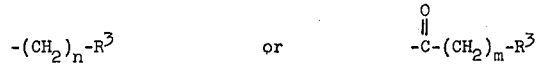

in which m is an integer of 0 to 4 inclusive, n is an integer of 1 to 5 inclusive, $R^3$ is hydrogen, a cycloalkyl group of 3 to 8 carbons, or a phenyl having the formula

in which $R^5$ is selected from the group consisting of H, F, Cl, Br, trifluoromethyl, (lower)alkyl, (lower)alkoxy or hydroxy; or a pharmaceutically acceptable salt thereof.

2. A compound of claim 1 having the formula

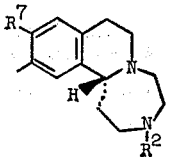

wherein $R^7$ and $R^8$ are hydroxy, (lower)alkanoyloxy or (lower)alkoxy, $R^2$ is a group having the formula $$-(CH_2)_n-R^3 \quad \text{or} \quad -\overset{O}{\underset{\|}{C}}-(CH_2)_m-R^3$$

in which $n$ is an integer of 1 to 5 inclusive, $m$ is an integer of 0 to 4 inclusive, $R^3$ is hydrogen, a cycloalkyl group of 3 to 8 carbons inclusive, or a phenyl having the formula

[structure of phenyl with $R^5$]

in which $R^5$ is selected from the group consisting of H, F, Cl, Br, trifluoromethyl, (lower)alkyl, (lower)alkoxy or hydroxy; or a pharmaceutically acceptable nontoxic salt thereof.

3. A compound of claim 2 wherein $R^7$ and $R^8$ are hydroxy, (lower)alkanoyloxy or (lower)alkoxy; $R^2$ is a group having the formula $$-(CH_2)_n-R^3 \quad \text{or} \quad -\overset{O}{\underset{\|}{C}}-(CH_2)_m-R^3$$

in which $n$ is an integer of 1 to 5 inclusive, $m$ is an integer of 0 to 4 inclusive, $R^3$ is hydrogen or a phenyl having the formula

[structure of phenyl with $R^5$]

in which $R^5$ is selected from the group consisting of H, F, Cl, Br, trifluoromethyl, (lower)alkyl, (lower)alkoxy or hydroxy; or a pharmaceutically acceptable nontoxic salt thereof.

4. A compound of claim 2 wherein $R^7$ and $R^8$ are hydroxy or alkanoyloxy; $R^2$ is a group having the formula $$—(CH_2)_n—R^3$$

in which $n$ is an integer of 1 to 5 inclusive, $R^3$ is hydrogen or a phenyl having the formula

[structure of phenyl with $R^5$]

in which $R^5$ is selected from the group consisting of H, F, Cl, Br, trifluoromethyl, (lower)alkyl, (lower)alkoxy or hydroxy; or a pharmaceutically acceptable nontoxic salt thereof.

5. A compound of claim 2 wherein $R^7$ and $R^8$ are hydroxy or acetoxy; $R^2$ is a group having the formula $$—(CH_2)_n—R^3$$

in which $n$ is an integer of 1 to 5 inclusive, $R^3$ is hydrogen or a phenyl having the formula

[structure of phenyl with $R^5$]

in which $R^5$ is selected from the group consisting of H, F, Cl, Br, trifluoromethyl, (lower)alkyl, (lower)alkoxy or hydroxy; or a pharmaceutically acceptable nontoxic salt thereof.

6. A compound of claim 2 wherein $R^7$ and $R^8$ are hydroxy or acetoxy; $R^2$ is a group having the formula $$—(CH_2)_n—R^3$$

in which $n$ is an integer of 1 to 3 inclusive, $R^3$ is hydrogen or phenyl; or a pharmaceutically acceptable nontoxic salt thereof.

7. A compound of claim 2 wherein $R^7$ and $R^8$ are hydroxy or acetoxy; $R^2$ is a group having the formula $$—(CH_2)_n—R^3$$

in which $n$ is an integer of 1 to 3 inclusive, and $R^3$ is phenyl; or a pharmaceutically acceptable salt thereof.

8. The compound having the formula

[structure: tetrahydroisoquinoline with HO, HO substituents fused to diazepine bearing $CH_2-CH_2-$phenyl]

or the hydrochloride or hydrobromide salts thereof.

9. A compound having the formula

[structure with $R^7$, $R^8$ substituents]

in which $R^7$ and $R^8$ are alike and are (lower)alkoxy, hydroxy or (lower)alkanoyloxy.

10. A compound of claim 1 having the formula

[structure with $R^7$, $R^8$, $R^2$ substituents]

wherein $R^8$ is hydrogen and $R^7$ is hydrogen, hydroxy, (lower)alkanoyloxy or (lower)alkoxy; $R^2$ is a group having the formula $$-(CH_2)_n-R^3 \quad \text{or} \quad -\overset{O}{\underset{\|}{C}}-(CH_2)_m-R^3$$

in which $n$ is an integer of 1 to 5 inclusive, $m$ is an integer of 0 to 4 inclusive, $R^3$ is hydrogen, a cycloalkyl group of 3 to 8 carbons inclusive, or a phenyl having the formula

[structure of phenyl with $R^5$]

in which $R^5$ is selected from the group consisting of H, F, Cl, Br, trifluoromethyl, (lower)alkyl, (lower)alkoxy or hydroxy; or a pharmaceutically acceptable nontoxic salt thereof.

11. A compound of claim 10 wherein $R^7$ is hydrogen, hydroxy, (lower)alkanoyloxy or (lower)alkoxy; $R^2$ is a group having the formula $$-(CH_2)_n-R^3 \quad \text{or} \quad -\overset{O}{\underset{\|}{C}}-(CH_2)_m-R^3$$

in which $n$ is an integer of 1 to 5 inclusive, $m$ is an integer of 0 to 4 inclusive, $R^3$ is hydrogen or a phenyl having the formula

[structure of phenyl with $R^5$]

in which $R^5$ is selected from the group consisting of H, F, Cl, Br, trifluoromethyl, (lower)alkyl, (lower)alkoxy or hydroxy; or a pharmaceutically acceptable nontoxic salt thereof.

12. A compound of claim 10 wherein $R^7$ is hydrogen, hydroxy or (lower)alkanoyloxy; $R^2$ is a group having the formula $$—(CH_2)_n—R^3$$

in which $n$ is an integer of 1 to 5 inclusive, $R^3$ is hydrogen or a phenyl having the formula

[structure of phenyl with $R^5$]

in which $R^5$ is selected from the group consisting of H, F, Cl, Br, trifluoromethyl, (lower)alkyl, (lower)alkoxy or hydroxy; or a pharmaceutically acceptable nontoixic salt thereof.

13. A compound of claim 10 wherein $R^7$ is hydroxy, hydrogen or acetoxy; $R^2$ is a group having the formula

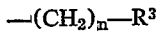
—(CH₂)ₙ—R³ in which $n$ is an integer of 1 to 3 inclusive, $R^3$ is hydrogen or phenyl; or a pharmaceutically acceptable nontoxic salt thereof.

14. A compound of claim 10 wherein $R^7$ is hydrogen, hydroxy or acetoxy; $R^2$ is a group having the formula

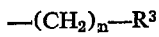
—(CH₂)ₙ—R³ in which $n$ is an integer of 1 to 3 inclsive, and $R^3$ is phenyl; or a pharmaceutically acceptable salt thereof.

15. An essentially pure "S" isomer of a compound of claim 10.

16. The levorotatory isomer of the compound having the formula

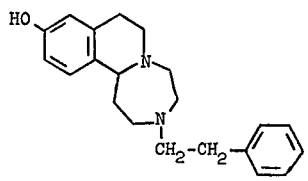

or the hydrochloride or hydrobroimic salt thereof.

17. The essentially pure levorotatory isomer of the compound of claim 16 or the hydrochloride or hydrobromide salts thereof.

18. A compound having the formula

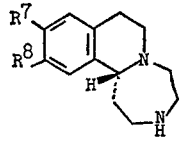

in which $R^8$ is hydrogen and $R^7$ is hydrogen, (lower)alkoxy, hydroxy or (lower)alkanoyloxy.

References Cited

UNITED STATES PATENTS

| | | | |
|---|---|---|---|
| 3,045,008 | 7/1962 | Lombardino | 260—288 X |
| 3,151,116 | 9/1964 | de Stevens | 260—268 PL |
| 3,393,195 | 7/1968 | Thesing | 260—288 X |
| 3,468,890 | 9/1969 | Archer | 260—268 PL |
| 3,359,120 | 1/1971 | Archer | 260—288 X |

OTHER REFERENCES

Chem. Abstr. Subj Index, vol. 55–65, "CHQ-DID" (1966), p. 7376s.

DONALD G. DAUS, Primary Examiner

U.S. Cl. X.R.

260—239.3 T, 283 CN, 283 SY, 287 R, 288 R; 424—258